United States Patent
Ge et al.

(10) Patent No.: US 8,836,879 B2
(45) Date of Patent: Sep. 16, 2014

(54) DISPLAYS WITH MINIMIZED CURTAIN MURA

(75) Inventors: Zhibing Ge, Sunnyvale, CA (US); Diane L. Culbert, San Jose, CA (US); David A. Doyle, Los Gatos, CA (US); Jun Qi, Cupertino, CA (US); Cheng Chen, San Jose, CA (US); Shawn R. Gettemy, San Jose, CA (US)

(73) Assignee: Apple Inc., Cupertino, CA (US)

( * ) Notice: Subject to any disclaimer, the term of this patent is extended or adjusted under 35 U.S.C. 154(b) by 52 days.

(21) Appl. No.: 12/813,458

(22) Filed: Jun. 10, 2010

(65) Prior Publication Data

US 2011/0304785 A1    Dec. 15, 2011

(51) Int. Cl.
  *G02F 1/136*   (2006.01)
  *G02F 1/1333*  (2006.01)
  *G02F 1/13363* (2006.01)
  *G02F 1/1362*  (2006.01)
  *G02F 1/1335*  (2006.01)

(52) U.S. Cl.
  CPC ...... *G02F 1/136209* (2013.01); *G02F 1/13363* (2013.01); *G02F 2001/133562* (2013.01); *G02F 2413/07* (2013.01); *G02F 1/133502* (2013.01); *G02F 2001/133567* (2013.01); *G02F 1/136286* (2013.01)
  USPC ............................................. 349/44; 349/110

(58) Field of Classification Search
  USPC .................. 349/96–98, 110, 117–119, 42–44
  See application file for complete search history.

(56) References Cited

U.S. PATENT DOCUMENTS

| | | | |
|---|---|---|---|
| 5,124,824 | A | 6/1992 | Kozaki et al. |
| 5,138,474 | A | 8/1992 | Arakawa |
| 5,189,538 | A | 2/1993 | Arakawa |
| 5,243,451 | A | 9/1993 | Kanemoto et al. |

(Continued)

FOREIGN PATENT DOCUMENTS

| | | |
|---|---|---|
| EP | 1306716 | 5/2003 |
| JP | 61-029820 | 10/1986 |

(Continued)

OTHER PUBLICATIONS

"NH Film viewing Angle Compensator Film for TFT LCDs", Nippon Oil Corporation, [online], retrieved May 20, 2010, <http://www.eneos.co.jp/english/products/lcfilm/e71_enprlc_nhspec.html>.

(Continued)

*Primary Examiner* — Dung Nguyen
(74) *Attorney, Agent, or Firm* — Treyz Law Group; G. Victor Treyz (57) ABSTRACT

Displays such as liquid crystal displays may be provided with structures that minimize curtain mura. A display may have upper and lower polarizers. A color filter layer and a thin film transistor layer may be located between the upper and lower polarizers. A liquid crystal layer may be interposed between the color filter layer and the thin film transistor layer. A first optical film layer that includes a birefringent compensating layer may be located between the upper polarizer and the color filter layer. A second optical film layer that is devoid of birefringent compensating layers may be located between the thin film transistor layer and the lower polarizer. A grid of metal signal lines may be used to distribute signals to thin film transistors on the thin film transistor layer. A black mask may be interposed between the grid of signal lines and the thin film transistor layer.

18 Claims, 5 Drawing Sheets

(56) References Cited

U.S. PATENT DOCUMENTS

| | | | |
|---|---|---|---|
| 5,456,867 | A | 10/1995 | Mazaki et al. |
| 5,480,964 | A | 1/1996 | Harris et al. |
| 5,491,001 | A | 2/1996 | Mazaki et al. |
| 5,526,150 | A | 6/1996 | Mazaki et al. |
| 5,580,950 | A | 12/1996 | Harris et al. |
| 5,612,801 | A | 3/1997 | Winker |
| 5,619,352 | A | 4/1997 | Koch et al. |
| 5,638,197 | A | 6/1997 | Gunning, III et al. |
| 5,699,137 | A | 12/1997 | Kishimoto |
| 5,883,685 | A | 3/1999 | Mazaki et al. |
| 5,940,155 | A | 8/1999 | Yang et al. |
| 6,157,471 | A | 12/2000 | Bignolles et al. |
| 6,831,722 | B2 | 12/2004 | Ishikawa et al. |
| 6,881,457 | B2 | 4/2005 | Tasaka et al. |
| 2004/0135939 | A1* | 7/2004 | Luo ............... 349/110 |
| 2007/0002233 | A1 | 1/2007 | Yano et al. |
| 2009/0103029 | A1 | 4/2009 | Miyazaki et al. |

FOREIGN PATENT DOCUMENTS

| | | |
|---|---|---|
| JP | 03125123 | 5/1991 |
| JP | 2003177427 | 6/2003 |
| JP | 2006178401 | 7/2006 |
| JP | 2008209676 | 9/2008 |
| KR | 20090053612 | 5/2009 |
| TW | I266135 | 11/2006 |
| TW | 200829632 | 7/2008 |
| TW | 200839325 | 10/2008 |
| TW | 201011356 | 3/2010 |

OTHER PUBLICATIONS

Wikipedia contributors. "List of refractive indices." Wikipedia, The Free Encyclopedia, [online], retrieved, Oct. 10, 2012 <URL: http://en.wikipedia.org/w/index.php?title=List_of_refractive_indices&oldid=514760018>.

* cited by examiner

DISPLAYS WITH MINIMIZED CURTAIN MURA

BACKGROUND

This relates generally to displays, and, more particularly, to displays such as liquid crystal displays.

Displays are widely used in electronic devices to display images. Displays such as liquid crystal displays display images by controlling liquid crystal material associated with an array of image pixels. A typical liquid crystal display has a color filter layer and a thin film transistor layer formed between polarizer layers. The color filter layer has an array of pixels each of which includes color filter subpixels of different colors. The thin film transistor layer contains an array of thin film transistor circuits. The thin film transistor circuits can be adjusted individually for each subpixel to control the amount of light that is produced by that subpixel. A light source such as a backlight may be used to produce light that travels through each of the layers of the display.

A layer of liquid crystal material is interposed between the color filter layer and the thin film transistor layer. During operation, the circuitry of the thin film transistor layer applies signals to an array of electrodes in the thin film transistor layer. These signals produce electric fields in the liquid crystal layer. The electric fields control the orientation of liquid crystal material in the liquid crystal layer and change how the liquid crystal material affects polarized light.

An upper polarizer is formed on top of the display and a lower polarizer is formed on the bottom of the display. As light travels through the display, the adjustments that are made to the electric fields in the liquid crystal layer are used to control the image that is displayed on the display.

The liquid crystal layer in liquid crystal displays exhibits a natural birefringence. In a birefringent layer, the index of refraction of the layer varies as a function of the polarization of incoming light. If left uncompensated, the birefringence of the liquid crystal layer in a display can adversely affect off-axis image quality and can therefore limit viewing angle.

Off-axis display performance can be improved by including a birefringent compensating layer in a liquid crystal display. The compensating layer, which is typically located between the lower polarizer and the thin film transistor layer, has birefringent properties that counteract the effects of the liquid crystal layer. Birefringent compensating layers are often formed from polymerized liquid crystals and may exhibit indices of refraction of about 1.5 to 1.8.

Signals may be applied to the electrodes in the thin-film-transistor layer using a grid of signal lines. The signal lines may include orthogonal sets of gate lines and data lines. The gate lines may be connected to the gates of thin film transistors that drive signals onto the electrodes. The data lines may distribute power supply voltages.

The electrodes in the thin film transistor layer are generally formed from a transparent conductive material such as indium tin oxide. The electrodes are conductive, so that they can be used to apply an electric field to an associated image pixel region of the liquid crystal layer. The electrodes are transparent so that light that passes through the image pixel regions will not be blocked by the presence of the electrodes.

To ensure that the signal lines in the thin film transistor layer are sufficiently conductive to effectively distribute signals to the thin film transistors and their associated electrodes, the signal lines are generally formed from metal. Metals have a significantly higher conductivity than transparent conductive materials such an indium tin oxide and are satisfactory when used to distribute control signals to the thin film transistors and electrodes on the thin film transistor layer.

However, the use of metal in forming the grid of signal lines in a liquid crystal display can lead to unsightly visible artifacts due to optical interference. These artifacts, which are sometimes referred to as curtain mura, result from the Moiré effect. Due to the presence of high index materials beneath the grid lines such as birefringent compensating films, there is an index of refraction discontinuity beneath the grid lines. This discontinuity forms a reflective interface that can reflect and image of the underside of the grid lines towards a viewer. The grid lines and the pattern of the reflected image of the underside of the grid lines can optically interfere with each other, leading to an undesirable Moiré pattern that is visible to a user of the display. Even though the pitch of the grid lines may be small (e.g., tens of microns), the bands of dark and light lines in the Moiré pattern can be one or more centimeters in width and can therefore interfere significantly with a user's ability to discern images on the display.

It would therefore be desirable to be able to provide improved displays such as displays that exhibit minimized curtain mura.

SUMMARY

Displays such as liquid crystal displays may have upper and lower polarizers. A display may have a color filter layer and a thin film transistor layer. The color filter layer and the thin film transistor layer may be located between upper and lower polarizers.

A liquid crystal layer may be interposed between the color filter layer and the thin film transistor layer. Thin film transistors on the thin film transistor layer and transparent electrodes may be used in applying patterns of electric fields to the liquid crystal layer.

A grid of signal lines may be used to distribute signals to the thin film transistors. The grid of signal lines may be formed from a shiny material such as metal. To minimize reflections from the underside of the signal lines, a patterned black mask may be interposed between the grid of signal lines and the thin film transistor layer. Reducing signal line reflections in this way may help to minimize curtain mura.

Curtain mura may also be minimized by ensuring that there are no large index of refraction discontinuities in the films below the thin film transistor layer. A display may have a first optical film layer that is located between the upper polarizer and the color filter layer and a second optical film layer that is located between the thin film transistor layer and the lower polarizer. Reflection-inducing interfaces in the region below the thin film transistor layer may be avoided by ensuring that high-index layers such as birefringent compensating layers are located above the color filter in the first optical film layer rather than below the thin film transistor layer in the second optical film layer.

Further features of the invention, its nature and various advantages will be more apparent from the accompanying drawings and the following detailed description of the preferred embodiments.

DETAILED DESCRIPTION

Displays are widely used in electronic devices. For example, displays may be used in computer monitors, laptop computers, media players, cellular telephones, televisions, and other equipment. Displays may be based on plasma technology, organic-light-emitting-diode technology, liquid crystal structures, etc.

Liquid crystal displays are popular because they can exhibit low power consumption and good image quality. Liquid crystal display structures are sometimes described herein as an example.

Figure 1:
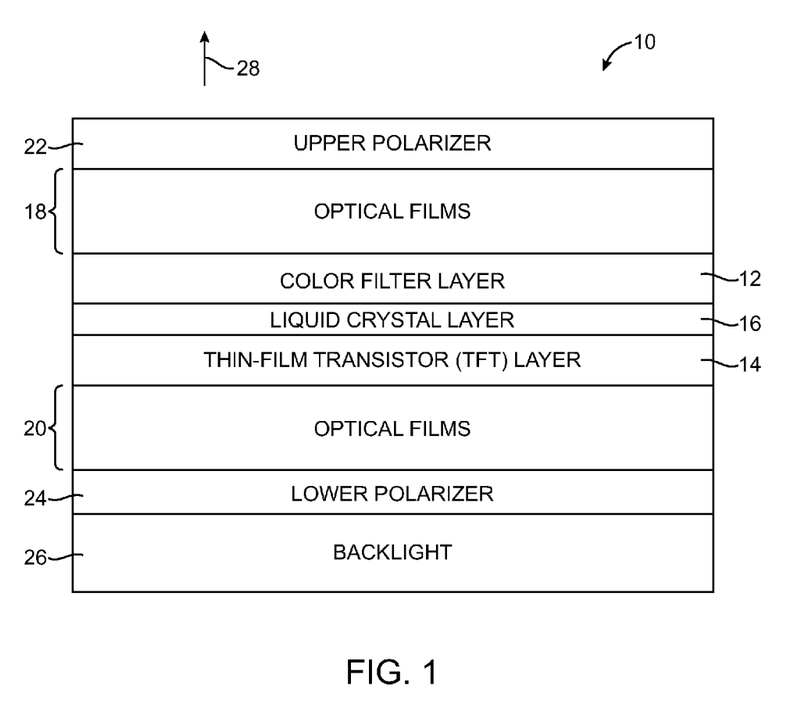
FIG. 1 is a cross-sectional side view of an illustrative display such as a liquid crystal display of the type that may be provided with structures to reduce curtain mura in accordance with an embodiment of the present invention.

A cross-sectional side view of an illustrative liquid crystal display is shown in FIG. 1. As shown in FIG. 1, display 10 may include color filter (CF) layer 12 and thin-film-transistor (TFT) layer 14. Color filter layer 12 may include an array of colored filter elements. In a typical arrangement, the pixels of layer 12 each include three colored pixels (e.g., red, green, and blue subpixels). Liquid crystal (LC) layer 16 includes liquid crystal material and is interposed between color filter layer 12 and thin-film-transistor layer 14. Thin-film-transistor layer 14 may include electrical components such as thin film transistors, capacitors, and electrodes for controlling the electric fields that are applied to liquid crystal layer 16.

Optical film layers 18 and 20 may be formed above and below color filter layer 12, liquid crystal layer 16, and thin-film-transistor layer 14. Optical films 18 and 20 may include structures such as quarter-wave plates, half-wave plates, diffusing films, optical adhesives, and birefringent compensating layers.

Display 10 may have upper and lower polarizer layers 22 and 24. Backlight 26 may provide backside illumination for display 10. Backlight 26 may include a light source such as a strip of light-emitting diodes. Backlight 26 may also include a light-guide plate and a back reflector. The back reflector may be located on the lower surface of the light-guide panel to prevent light leakage. Light from the light source may be injected into an edge of the light-guide panel and may scatter upwards in direction 28 through display 10.

Touch sensor structures may be incorporated into the layers of display 10. In a typical touch sensor configuration, an array of capacitive touch sensor electrodes is implemented using pads of a transparent conductive material such as indium tin oxide. Other touch technologies may be used if desired (e.g., resistive touch, acoustic touch, optical touch, etc.).

In black and white displays, color filter layer 12 can be omitted. In color displays, color filter layer 12 can be used to impart colors to an array of image pixels. Each image pixel may, for example, have three corresponding liquid crystal diode subpixels. Each subpixel may be associated with a separate color filter element in the color filter array. The color filter elements may, for example, include red (R) color filter elements, blue (B) color filter elements, and green (G) color filter elements. By controlling the amount of light transmission through each subpixel, a desired colored image can be displayed.

Figure 2:
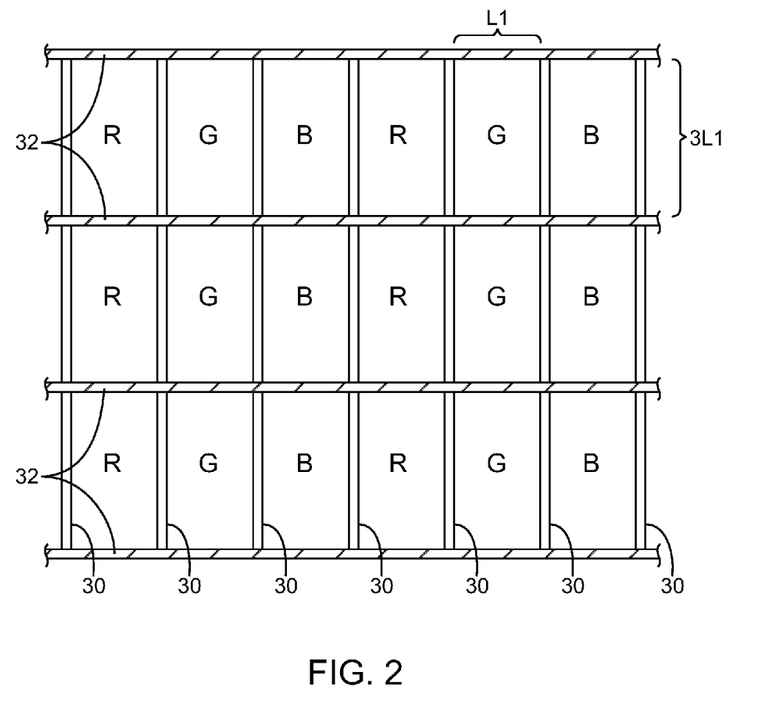
FIG. 2 is a top view of a display showing how a grid of signal lines may be used in distributing signals to image pixels in accordance with an embodiment of the present invention.

The amount of light transmitted through each subpixel can be controlled using control circuitry and electrodes. Each subpixel may, for example, be provided with a transparent indium tin oxide electrode. The signal on the electrode, which controls the electric field through an associated portion of the liquid crystal layer and thereby controls the light transmission for the subpixel, may be applied using a thin film transistor. The circuitry for the array of subpixels in a display may be controlled using a grid of signal lines. As shown in FIG. 2, an array of colored subpixels R, G, and B may be controlled using a grid of signal lines made up of orthogonal sets of lines 30 and 32.

Lines 30 are sometimes referred to as data lines and may be used to distributing a power supply voltage to the pixel array. Lines 32 are sometimes referred to as gate lines and may be used to distribute gate control signals to an array of thin film transistors. There may be, for example, a respective thin film transistor for controlling the electric field that is produced by each electrode in the display. Each electrode may be associated with a red subpixel R, a green subpixel G, or a blue subpixel B (or other suitable color filter elements). As shown in FIG. 2, the width of each color filter element and associated cell of liquid crystal material may be L1 and the height of each color filter element and associated cell of liquid crystal material may be about 3L1 (as an example).

Figure 3:
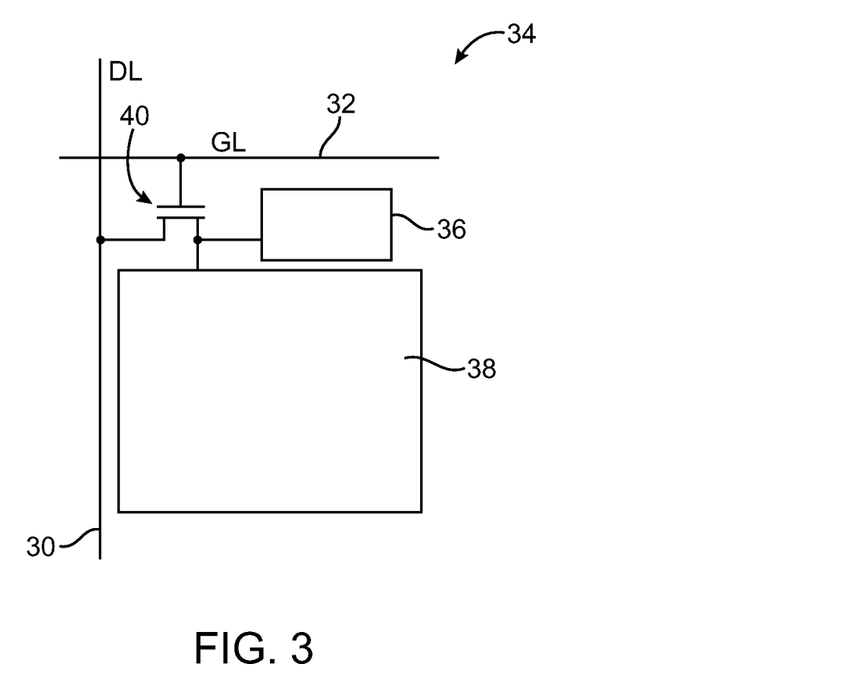
FIG. 3 is a partially schematic top view of an image pixel showing how a grid of signal lines such as data lines and gate lines may be used in controlling thin film transistor and electrode structures in a display such as a liquid crystal display in accordance with an embodiment of the present invention.

FIG. 3 is a diagram of an illustrative image pixel (subpixel) in display 10. As shown in FIG. 3, pixel 34 may have a capacitor 36, pixel electrode 38, and thin film transistor 40. Transistor 40 may have a gate that is controlled by gate line 32 and terminals coupled to data line 30, capacitor 36, and electrode 38. Other pixel circuits may be used if desired. The arrangement of FIG. 3 is merely illustrative.

Signal lines 30 and 32 may be formed from highly conductive materials such as metal (e.g., copper). The use of highly conductive materials such as metal in forming signal lines 30 and 32 ensures that lines 30 and 32 can effectively distribute signals to thin film transistors 40 and electrodes 38.

However, metals tend to be reflective (shiny), which raises a risk of producing unsightly visible artifacts in display 10 due to optical interference. If care is not taken, these artifacts, which are sometimes referred to as curtain mura, can interfere with the images on display 10.

Curtain mura is a result of the Moiré effect. Data lines 30 run parallel to each other and are spaced at regular intervals (e.g., 10-100 microns). Similarly, gate lines 32 are spaced apart at regular intervals (e.g., 30-300 microns). The grid of signal lines (lines 30 and 32) and reflections of the grid of signal lines may potentially interfere with each other to produce unsightly Moiré patterns (curtain mura).

Figure 4:
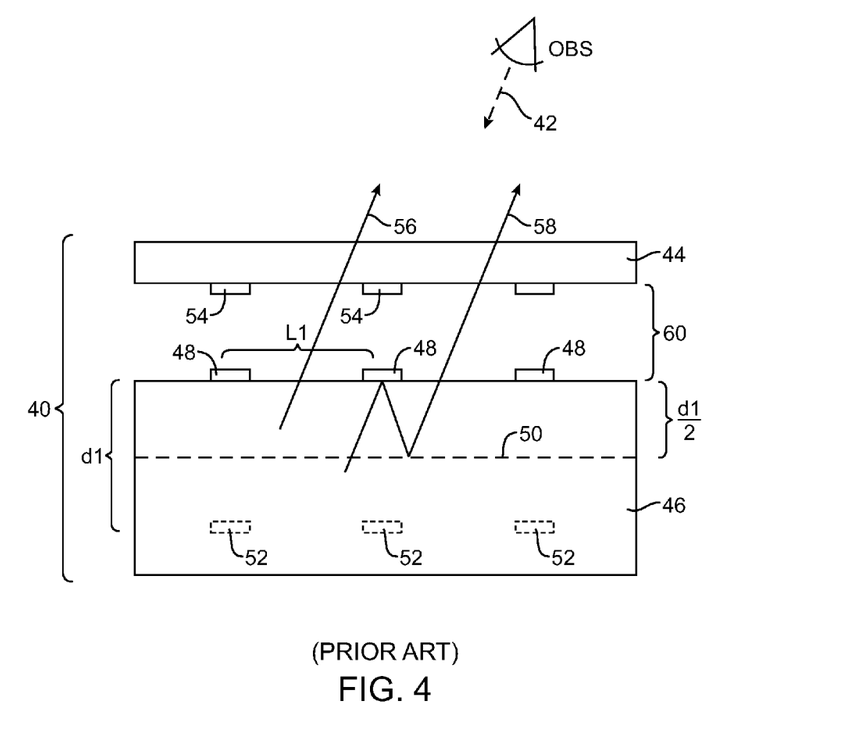
FIG. 4 is a cross-sectional side view of a portion of a conventional display showing how curtain mura may result from optical interference between a pattern of signal lines and a reflected image of the pattern of signal lines.

A cross-sectional diagram of a conventional display showing how curtain mura may arise is shown in FIG. 4. As shown in FIG. 4, display 40 may have upper optical layers 44 and lower optical layers 46. Upper optical layer 44 may include an upper polarizer formed on top of optical films and a color filter layer. Lower optical layer 46 may include a thin film transistor layer formed on top of optical films and a lower polarizer layer. Liquid crystal layer 60 may be interposed between optical layers 44 and 46.

Signal lines 48 (e.g., data lines or gate lines) may be spaced apart by a distance L1. Reflective interface 50 may lie at a depth of d1/2 below lines 48. Interface 50 may represent the upper surface of a birefringent compensating film. Compensating films may have maximum indices of refraction of about 1.8 to 2.0. Adjacent layers such as the glass substrates commonly used in thin film transistor layers typically have refractive index values that differ from this maximum amount by more than 0.2. For example, the index of refraction for a typical glass substrate for a thin film transistor layer might be about 1.45 to 1.55.

The large index different (>0.2) between the thin film transistor layer and the compensating layer gives rise to reflective interface 50. Reflective interface 50, in turn, can produce a reflected image of lines 48 (i.e., reflection 52 in FIG. 4). If the depth of interface 50 is d1/2, reflected image 52 of lines 48 will be located at a depth of d1, as shown in FIG. 4.

An observer OBS viewing display 40 in direction 42 will view two patterns of lines. The first pattern of lines corresponds to directly observed lines 48 and is conveyed by light rays such as light ray 56 that do not reflect from interface 50. The second pattern of lines corresponds to the reflected image of the undersides of lines 48 (i.e., image pattern 52). The origin of the second pattern of lines is illustrated by reflected ray 58. The effective spacing of image lines 52 is smaller than L1 due to the larger distance between lines 52 and the observer than between lines 48 and the observer.

From the perspective of the observer, both patterns of lines are present. Due to the Moiré effect, a Moiré interference pattern may therefore be observed. This interference pattern is undesirable and detracts from the quality of the image presented by display 40.

If a scenario in which the depth d1/2 of interface 50 is 0.4 mm, L1 is 30 microns, the average index of refraction of the layers in display 40 is 1.48, and the distance between the surface of display 40 and the observer OBS is 100 mm, the interference pattern will have a periodicity L given by equation 1 (i.e., about 10 mm in this example).

$$L=1.48*(100\text{ mm})*(30\text{ microns})/(0.4\text{ mm}) \quad (1)$$

Conventional displays include a black mask pattern (grid-shaped black mask 54 of FIG. 4) that covers signal lines 48 and reduces their visibility in direction 42. Conventional displays also sometimes include a diffusing layer such as a layer of hazy glue to smear out the lines in an attempt to reduce curtain mura. However, conventional black masks are generally unable to prevent curtain mura and diffusing layers tend to reduce contrast and make the display subject to washout effects in direct sunlight.

Figure 5:
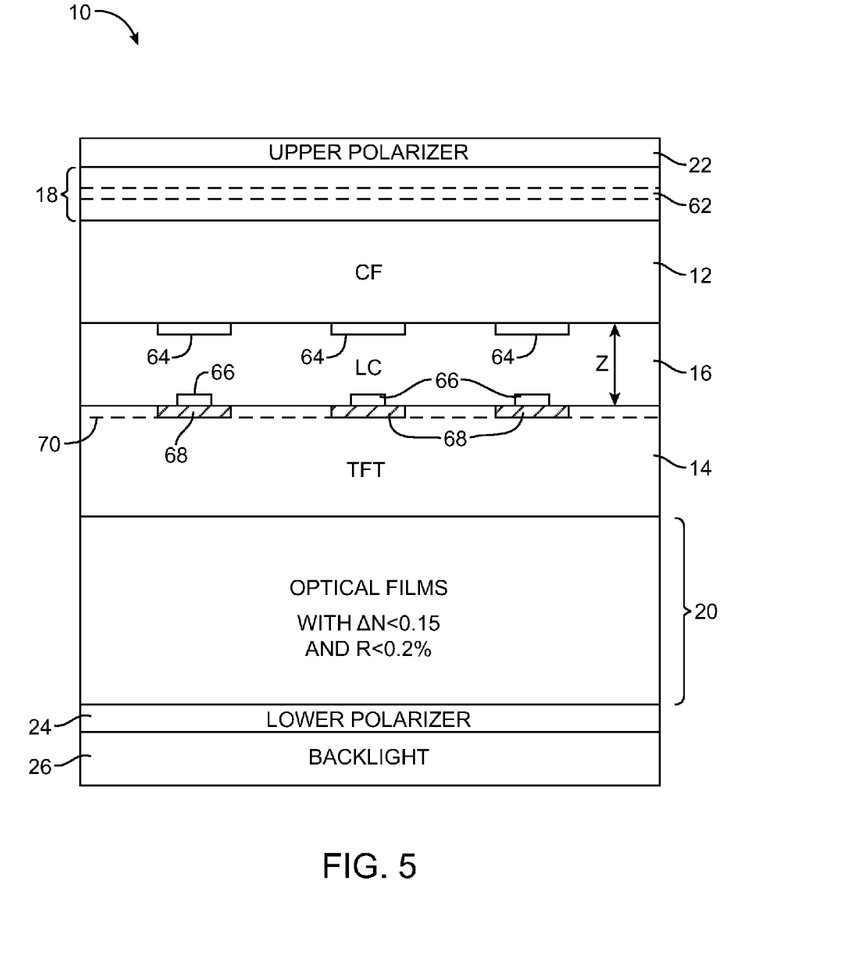
FIG. 5 is a cross-sectional view of a display such as a liquid crystal display showing structures and layer configurations that may be used in minimizing curtain mura in the display in accordance with an embodiment of the present invention.

These shortcomings of conventional displays can be addressed using a display of the type shown in FIG. 5. As shown in FIG. 5, display 10 may have a liquid crystal layer such as layer 16 located between color filter layer 12 and thin film transistor layer 14. Layer 16 may have a thickness Z of about 4 microns (as an example). Signal lines 66 may be formed on thin film transistor layer 14. Signal lines 66 may include lines such as data lines 30 and gate lines 32 (FIG. 2) arranged in a grid pattern. Signal lines 66 may be formed from metal or other conductive materials. Signals on signal lines 66 may be used to control a pattern of electric fields imposed on image pixel cells in liquid crystal layer 16 using circuitry of the type shown in FIG. 3, thereby creating a desired image on display 10. Patterned black mask layer 64 may be used to cover signal lines 66 and thereby block the upper surfaces of signal lines 66 from view through the front of display 10.

Backlight for display 10 may be provided by backlight 26. Display 10 may include an upper polarizer such as upper polarizer 22 and a lower polarizer such as lower polarizer 24. Optical films 18 may be located between upper polarizer 22 and color filter layer 12. Optical films 20 may be located between thin film transistor layer 14 and lower polarizer 24. Polarizers 22 and 24 may be formed from layers of polyvinyl alcohol (as an example). A typical index of refraction for polarizer layers 22 and 24 is about 1.5. Color filter layer 12 and thin film transistor layer 14 may be formed using glass substrates (as an example) and may each have an index of refraction of about 1.45 to 1.55.

To ensure that display 10 exhibits a satisfactory viewing angle, display 10 may be provided with a birefringent compensating film such as a polymerized liquid crystal film. The compensating film may exhibit an ordinary index of refraction of about 1.5 and an extraordinary index of refraction of 1.8 (as an example). Because an index of refraction value of 1.8 (the maximum index of refraction of the compensating film layer) is significantly different than the index of refraction for layer 14 (which is about 1.5), there is a potential for creating a reflective interface such as interface 50 of FIG. 4 if the compensating film is placed below layer 14. To avoid creating a significant reflective interface such as interface 50 in display 10, the compensating film is preferably located above thin film transistor layer 14. As shown in FIG. 5, for example, a birefringent compensating layer may be incorporated into optical layers 18 as layer 62. Compensating layer 62 may be implemented as one or more individual films and may use any suitable material (e.g., polymerized liquid crystals, other birefringent materials, etc.).

By placing the compensating layer in layers 18, the amount of reflection that is produced from below thin film transistor layer 14 is reduced or eliminated. Because the strength of the reflected image of signal lines 66 (shown as reflection 52 in the conventional display of FIG. 4) is reduced, curtain mura is minimized.

When the birefringent compensating layer is located where indicated by layer 62 of FIG. 5, there may be no remaining high-index materials below layer 14 (i.e., optical films 20 may contain no birefringent films or may contain only weakly birefringent films and may contain no films having an index of refraction of more than about 1.75 or 1.8). As shown in FIG. 5, in this configuration, films 20 represent non-birefringent or weakly birefringent optical films having an index of refraction different Δn with respect to the index of layer 14 that is no more than 0.15 (or no more than 0.2 or other suitable threshold value). This type of arrangement, in which optical film layer 20 is devoid of any isotropic or birefringent compensating film, ensures that the reflectivity of any buried reflective interface in layers 20 (i.e., any interface of the type described in connection with reflective interface 50 in conventional display 40 of FIG. 4) will have a reflectivity of less than 0.2%.

Curtain mura effects can also be minimized by blocking the lower surface of signal lines 66 from view. Signal lines 66 may be formed form a shiny material such as metal. If care is not taken, the shiny underside of lines 66 will be visible in the form of a reflection from within layers 20, as described in connection with reflection 52 of FIG. 4. The shiny underside of lines 66 can be at least partly blocked from view by including less visible structures beneath signal lines 66. As shown in FIG. 5, for example, light-blocking structures 68 may be formed under lines 66. Light-blocking structures 68 may be formed from oxidized metal (e.g., chromium oxide, which appears black), black ink, other black masks, etc. To prevent structures 68 from being visible themselves, structures 68 may be formed from a non-shiny (matte) substance and are therefore sometimes referred to herein as black mask structures or a black mask.

Thin film transistor layer 14 may have a transparent substrate such as a glass substrate. The lower surface of the glass substrate may be aligned with the upper surface of films 20. The upper surface of the glass substrate, which is illustrated by dashed line 70 of FIG. 5, may be used to support image pixel structures of the type shown in FIG. 3 (e.g., signal lines, etc.)

Black mask structures 68 may be formed between signal lines 66 and surface 70 of the transparent glass thin film transistor substrate in layer 14 or at any other suitable location within display 10 that blocks the shiny underside of lines 66 and prevents the underside of lines 66 from being visible in the form of a reflection from a reflective interface below thin film transistor layer 20. With one suitable configuration, black mask 68 may be formed on the glass substrate of layer 14 and lines 66 may be deposited and patterned on top of black mask 68 using photolithographic techniques. Lines 66 typically include data lines 30 and gate lines 32 arranged in a grid and black mask 68 preferably has a matching grid shape.

If desired, black mask structures 68 may be used in displays that include a birefringent compensating layer within layer 20. In this type of configuration, a reflective interface such as interface 50 of FIG. 4 may be present but, due to the presence of black mask 68, the lower surfaces of signal lines 66 will be hidden from view and will not be reflected back towards the user through the surface of display 10.

In configurations such as the illustrative configuration of FIG. 5 in which compensating layer 62 is located above color filter layer 12 to ensure that layer 20 has an index difference of less than 0.15 relative to layer 14 and in which black mask 68 is present, the suppression of curtain mura will generally be maximized.

The foregoing is merely illustrative of the principles of this invention and various modifications can be made by those skilled in the art without departing from the scope and spirit of the invention. The foregoing embodiments may be implemented individually or in any combination.

What is claimed is:

1. A display, comprising:
    a thin film transistor layer having a transparent thin film transistor substrate, wherein the thin-film transistor layer includes an array of thin-film transistors having gate terminals;
    a grid of signal lines on the thin film transistor substrate, wherein the signal lines comprise gate lines coupled to the gate terminals of the thin-film transistors and data lines that distribute power supply voltages; and
    a patterned black mask between the grid of signal lines and the thin film transistor substrate, wherein the patterned black mask comprises black mask material directly beneath and directly touching at least some of the gate lines and at least some of the data lines.

2. The display defined in claim 1 further comprising:
    a color filter layer; and
    a liquid crystal layer interposed between the color filter layer and the grid of signal lines.

3. The display defined in claim 2 further comprising an additional black mask located between the liquid crystal layer and the color filter layer.

4. The display defined in claim 2 further comprising:
    a first polarizer;
    a second polarizer;
    a first optical film layer located between the first polarizer and the color filter layer; and
    a second optical film layer located between the second polarizer and the thin film transistor layer.

5. The display defined in claim 4 wherein the first optical film layer comprises a birefringent compensating layer.

6. The display defined in claim 4 wherein the first optical film layer comprises a birefringent compensating layer and wherein the second optical film layer is devoid of any birefringent compensating layers.

7. The display defined in claim 4 wherein the first optical film layer comprises a birefringent compensating layer, wherein the second layer of optical films is characterized by a maximum index of refraction, wherein there are no films between the second polarizer and the thin film transistor layer having an index of refraction greater than the maximum index of refraction, wherein the thin film transistor layer is characterized by an index of refraction, and wherein the maximum index of refraction of the layer of second optical films minus the index of refraction of the thin film transistor layer has a magnitude less than 0.15.

8. The display defined in claim 1 further comprising:
    a lower polarizer; and
    a layer of optical films interposed between the lower polarizer and the thin film transistor substrate, wherein the layer of optical films is characterized by a maximum index of refraction, wherein the thin film transistor substrate is characterized by an index of refraction, and wherein the maximum index of refraction of the layer of optical films minus the index of refraction of the thin film transistor substrate has a magnitude less than 0.15.

9. The display defined in claim 8 further comprising a backlight adjacent to the lower polarizer.

10. The display defined in claim 9 further comprising:
    a color filter layer; and
    a liquid crystal layer interposed between the color filter layer and the grid of signal lines.

11. The display defined in claim 1 further comprising:
    a lower polarizer; and
    a layer of optical films between the thin film transistor layer and the lower polarizer, wherein the layer of optical films exhibits a reflectivity of less than 0.2% for light passing from the thin film transistor layer towards the lower polarizer.

12. The display defined in claim 11 further comprising:
    a color filter layer; and
    a liquid crystal layer interposed between the color filter layer and the grid of signal lines.

13. The display defined in claim 12 further comprising:
    a backlight adjacent to the lower polarizer; and
    an upper polarizer, wherein the color filter layer is interposed between the upper polarizer and the liquid crystal layer.

14. The display defined in claim 13 further comprising a birefringent compensating layer between the upper polarizer and the color filter layer.

15. A display, comprising:
    a thin film transistor layer that includes an array of thin film transistors having gate terminals;
    a color filter layer; and
    a liquid crystal layer interposed between the color filter layer and the thin film transistor layer;
    a grid of signal lines, wherein the signal lines distribute signals to the thin film transistors and wherein the signal lines comprise gate lines coupled to the gate terminals of the thin-film transistors and data lines that distribute power supply voltages; and
    a black mask interposed between the grid of signal lines and the thin film transistor layer, wherein the black mask comprises black mask material that directly touches the gate lines and at least some of the data lines.

16. The display defined in claim 15 further comprising:
an upper polarizer; and
a first layer of optical films that is interposed between the upper polarizer and the color filter layer and that includes a birefringent compensating layer.

17. The display defined in claim 16 further comprising:
a lower polarizer; and
a second layer of optical films that is interposed between the lower polarizer and the thin film transistor layer, wherein the second layer of optical films is characterized by a maximum index of refraction, wherein there are no films between the lower polarizer and the thin film transistors layer having an index of refraction greater than the maximum index of refraction, wherein the thin film transistor layer is characterized by an index of refraction, and wherein the maximum index of refraction of the layer of second optical films minus the index of refraction of the thin film transistor layer has a magnitude less than 0.15.

18. The display defined in claim 15 wherein the signal lines comprises metal and wherein the black mask comprises a metal oxide.

* * * * *